United States Patent [19]
Ibanez-Meier et al.

[11] Patent Number: 5,946,603
[45] Date of Patent: Aug. 31, 1999

[54] METHOD AND APPARATUS TO RESPOND TO A BLOCKAGE ENVIRONMENT IN A COMMUNICATION SYSTEM

[75] Inventors: Rodrigo Ibanez-Meier, Chandler; Randy Lee Turcotte, Tempe; Richard Lawrence Astrom, Gilbert, all of Ariz.; Sergio Aguirre, Trophy Club, Tex.

[73] Assignee: Motorola, Inc., Schaumburg, Ill.

[21] Appl. No.: 08/845,487

[22] Filed: Apr. 25, 1997

[51] Int. Cl.⁶ .............................. H04B 7/185; G01R 1/24
[52] U.S. Cl. ......................... 455/13.1; 343/703; 455/436
[58] Field of Search ............................... 455/12.1, 13.1, 455/504, 505, 428, 427, 10, 68, 62, 63, 429, 446, 423, 424, 425, 436; 343/703

[56] References Cited

U.S. PATENT DOCUMENTS

| | | | |
|---|---|---|---|
| 4,346,385 | 8/1982 | Schiavone et al. | 343/703 |
| 5,095,500 | 3/1992 | Tayloe et al. | 379/32 |
| 5,134,709 | 7/1992 | Bi et al. | 455/452 |
| 5,257,405 | 10/1993 | Reitberger | 455/514 |
| 5,303,286 | 4/1994 | Wiedeman | 455/428 |
| 5,410,736 | 4/1995 | Hoque | 455/504 |
| 5,422,813 | 6/1995 | Schuchman et al. | 701/214 |
| 5,561,841 | 10/1996 | Markus | 455/33.1 |
| 5,603,083 | 2/1997 | Lee | 455/562 |
| 5,634,206 | 5/1997 | Reed et al. | 455/277.1 |
| 5,669,063 | 9/1997 | Brockel et al. | 455/506 |
| 5,710,758 | 1/1998 | Soliman et al. | 370/241 |
| 5,794,128 | 8/1998 | Brockel et al. | 455/67.1 |
| 5,815,796 | 9/1998 | Armstrong et al. | 455/10 |
| 5,815,813 | 9/1998 | Faruque | 455/446 |

FOREIGN PATENT DOCUMENTS 9711536  9/1996  WIPO.

OTHER PUBLICATIONS

"Photogrammetric Mobile Satellite Service Prediction", by Riza Akturan and Wolfhard J. Vogel from NAPEX 94, Vancouver, BC Jun. 17, 1994.

"Path Diversity for LEO Satellite–PCS In The Urban Environment", by Riza Akturan and Wolfhard J. Vogel, from EERL–95–12A, Dec. 13, 1995.

*Primary Examiner*—Reinhard J. Eisenzopf
*Assistant Examiner*—Charles N. Appiah
*Attorney, Agent, or Firm*—Sherry J. Whitney; Frank J. Bogacz

[57] ABSTRACT

A method and apparatus for responding to a blockage environment (50) in a communication system includes creating (158, 163) a terminal blockage profile and/or a satellite blockage profile with respect to terminal antenna (19) and responding (200) to the terminal blockage profile and/or the satellite blockage profile to prevent fading and/or blocking of communication pathways (15, 18) between one or more satellites (12) and the terminal (16).

31 Claims, 7 Drawing Sheets

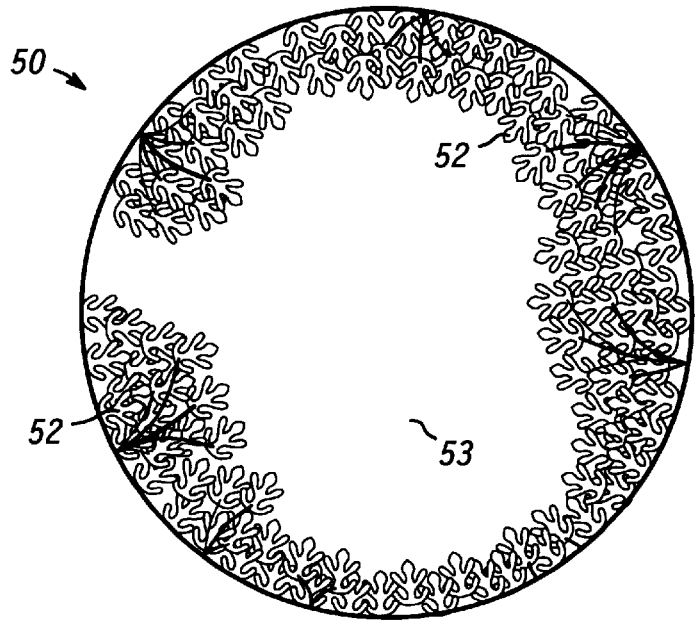
FIG. 4
FIG. 6
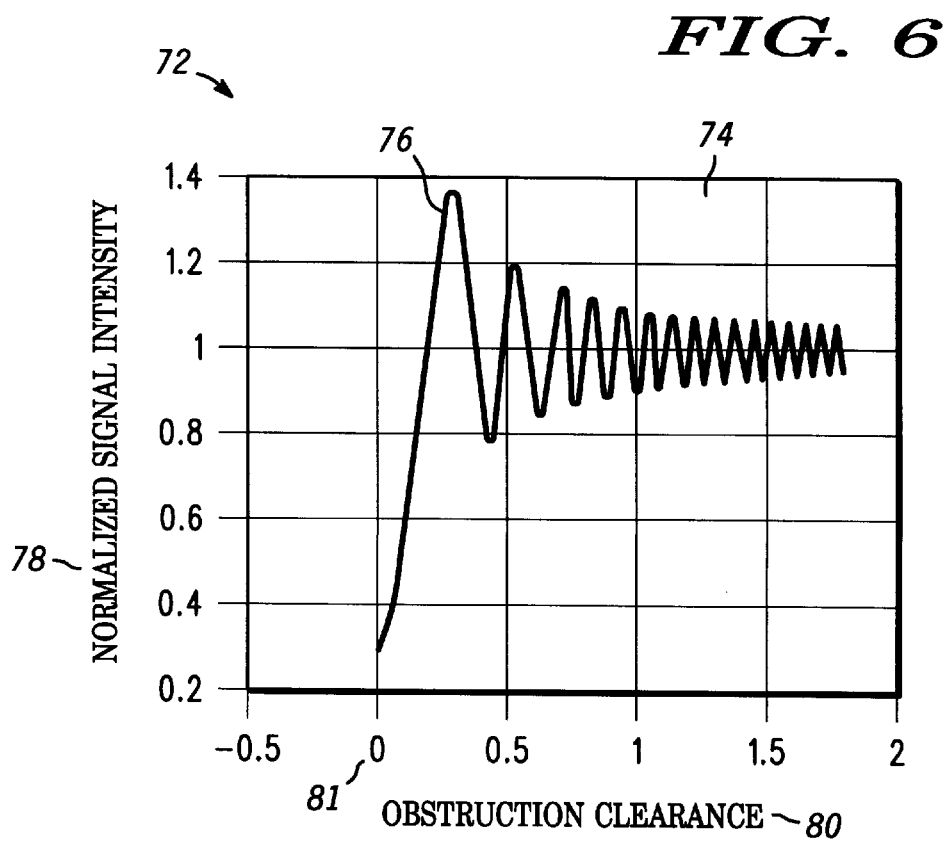

METHOD AND APPARATUS TO RESPOND TO A BLOCKAGE ENVIRONMENT IN A COMMUNICATION SYSTEM

FIELD OF THE INVENTION

This invention relates generally to the field of wireless communications, and more particularly to the field of fading and blocking in a wireless communication system.

BACKGROUND OF THE INVENTION

The frequency allocations for wireless communication networks employing non-geosynchronous satellite communications normally reside in the UHF-, L-, S-, and K-Band frequencies or higher. Wireless communication systems utilizing these bandwidths require a clear line-of-sight between each node of the communication network for high-quality communications. Objects such as trees, utility poles, mountains, buildings, and overpasses that lie along the communications path will effectively fade or block the communication transmissions at UHF-, L-, S-, and K-Band frequencies and higher, therefore degrading, interrupting, or terminating the communication path.

Therefore, what is needed is a system and a method of improving communications in a fade and blockage environment which includes real and potential line-of-sight obstructions in wireless communication systems. Further needed is a system and method for improving communications in systems employing non-geosynchronous satellites communicating in the UHF-, L-, S-, and K-Band frequencies and higher.

BRIEF DESCRIPTION OF THE DRAWINGS

The foregoing and further and more specific objects and advantages of the instant invention will become readily apparent to those skilled in the art from the following detailed description thereof taken in conjunction with the drawings in which:

FIG. 4 is a representation of a field of view of a terminal illustrating potential signal obstructions in accordance with a preferred embodiment of the present invention;

FIG. 6 is a terminal blockage profile based on Fresnel diffracted signals for a field of view of a terminal derived in accordance with a preferred embodiment of the present invention;

DETAILED DESCRIPTION OF A PREFERRED EMBODIMENT

Figure 1:
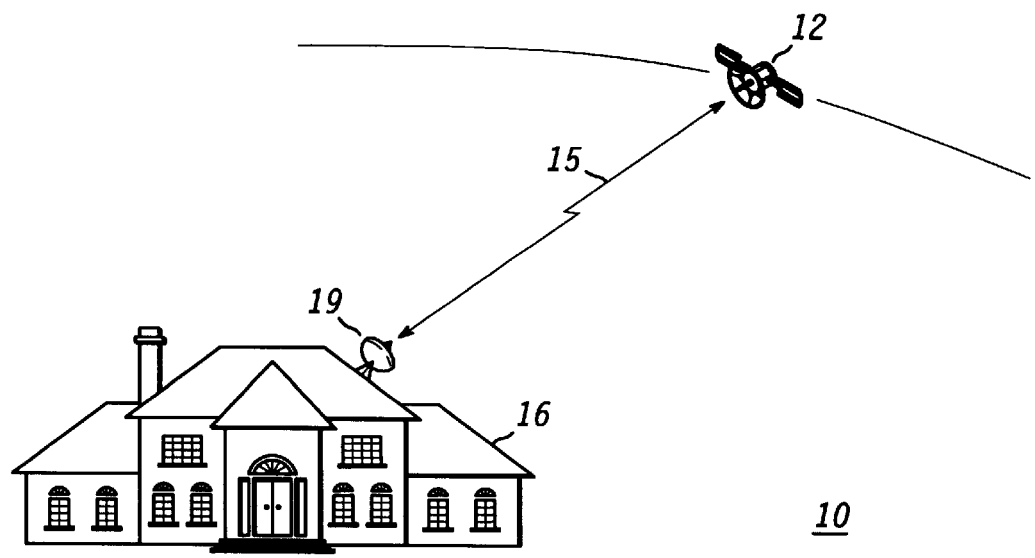
FIG. 1 illustrates a communication system for providing terminal-satellite communication links in accordance with a preferred embodiment of the present invention.

The present invention provides, among other things, a method and a system for measuring and responding to a blockage environment in a communication system. In a more specific aspect, wireless communication systems which operate at relatively high operating frequencies such as UHF-, L-, S-, and K-Band frequencies or higher, require unobstructed lines-of-sight between the nodes of the communication system to maintain high-quality communication pathways or links. If one or more obstructions partially or completely block a line of sight between the nodes, degradation, interruption, and/or termination of a communication pathway or link can result.

Non-geosynchronous satellite-based communication systems normally incorporate broadband services utilizing relatively high frequency allocations in communication links between one or more non-geosynchronous satellites and terminals based below, near, or above the surface of the earth. Non-geosynchronous satellites continuously move about the earth in predetermined orbital traverses. Therefore, in non-geosynchronous satellite-based communication systems, the quality of the communication pathways or links necessarily depends on the ability of the communication system to maintain the communication links in the presence of potential blocking, fading, interference and other factors that can severely affect communication pathways or links. Thus, unobstructed direct lines-of-sight between terminals and satellites are necessary to maintain the communication pathways at an adequate level of service.

With regard to earth-based or ground-based terminals, the motion of non-geosynchronous satellites with respect to the ground ultimately presents problems when one or more of the satellites reside at sufficiently low elevation angles relative to the terminals because of the line-of-sight blockage that ultimately occurs as a result of trees, buildings, mountains, and the like between the terminals and the satellites. Thus, to maintain the communication pathways or links, it is necessary to switch or hand-off the communication link or links from the obstructed satellite to another satellite in clear line-of-sight of the terminal. Although current algorithms are designed to switch or hand-off from a satellite which is about to drop below a minimum elevation angle to a new one which is higher than the minimum elevation angle with respect to the terminal, the present invention includes the provision of responding to the localized environmental obstructions around the terminal in order to maintain one or more communication links and to inhibit fading and blocking of one or more communication links.

It is contemplated that communication terminals include those that could be either continuously or intermittently mobile or perhaps positioned in a permanent location. Terminals could be individual ground-based customer premises units or a primary communication system control facility. It is also contemplated that terminals could be located anywhere below, near, or above the surface of the earth when suitable and practical.

In this regard, the field of view of a selected terminal at any location normally suffers from varying elevations of obstructions that can degrade, interrupt, and/or terminate communication links between the terminal and one or more of the non-geosynchronous satellites located at low elevation levels. The present invention increases the efficiency and economy of non-geosynchronous satellite-based communication systems utilizing relatively high-band frequencies and minimizes degradation, interruption, and termination of one or more of the communication links as a result of local environmental obstructions that can compromise the line-of-sight between terminals and satellites. The present invention is not only advantageous in combination with UHF-, L-, S-, and K-Bands and other higher frequency bands, but also any frequency band that is prone to fade and blockage as a result of obstructions or interference.

In specific application, FIG. 1 illustrates a communication system 10 for facilitating one or more terminal-satellite communication links. Reference communication elements of communication system 10 are represented satellite 12 and terminal 16. Satellite 12, also referred to as a node, transmits and maintains communication pathway or link 15 with a terminal 16 having an antenna 19 or other mechanism suitable for maintaining a communication link with one or more satellites 12. With respect to the present disclosure, satellite 12 is non-geosynchronous in relation to terminal 16. In alternate embodiments of the present invention, system nodes could be devices other than satellites 12. For example, a node could be a ground-based or aircraft-mounted transceiver. In addition, some of the advantages of the present invention could be realized where the node is stationary.

Consistent with the foregoing discussion, terminal 16 could be positioned below, near, or above the surface of the earth. In addition, terminal 16 could be mobile, movable from one location to another, or positioned in a permanent location. However, to facilitate ease of discussion, terminal 16 is a terrestrial ground-based terminal located at a selected position upon the surface of the earth. Communication system 10 operates at relatively high operating frequencies such as UHF-, L-, S-, and K-Band frequencies or higher. As a result, unobstructed lines-of-sight are desirable or required between one or more satellites 12 and terminal 16 to maintain one or more communication pathways or links 15.

Figure 2:
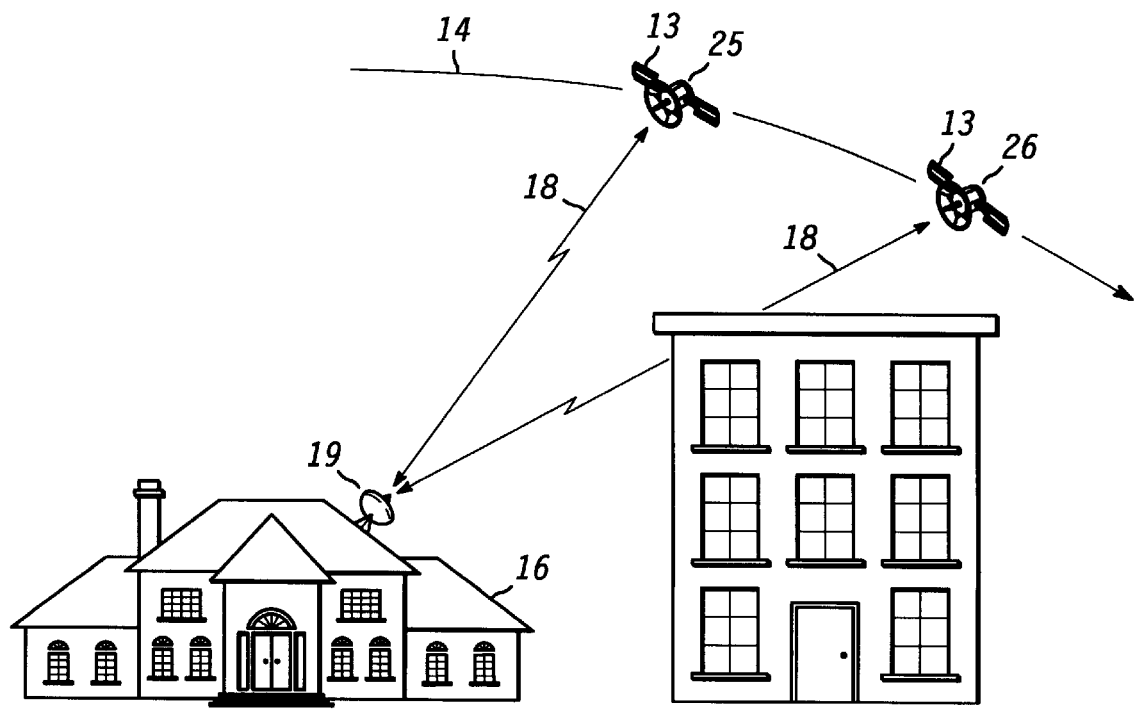
FIG. 2 illustrates a time stepped position of a satellite of the communication system of FIG. 1, a terminal, and a structure blocking a communications path between the satellite and the terminal in accordance with a preferred embodiment of the present invention.

To illustrate the anomaly and environment of fading and blocking, attention is directed to FIG. 2. In FIG. 2, illustrated is a time stepped position of a satellite 13 of communication system 10. Also shown is terminal 16 and communication link 18 maintained by and between satellite 13 and antenna 19 of terminal 16. A structure 20 is further shown positioned intermediate terminal 16 and satellite 13 when satellite 13 is in position 26. Arrowed line 14 indicates a flight path of satellite 13 along a predetermined orbital traverse. Satellite 13 is shown as it might appear at two different positions, position 25 and position 26, at two different instances along its flight path. Position 25 of satellite 13 is somewhat more elevated relative terminal 16 than position 26. In position 25, the line-of-sight and communication link 18 between satellite 13 and terminal 16 are completely unobstructed. However, in position 26, the line-of-sight and communication link 18 between satellite 13 and terminal 16 are obstructed by structure 20 which could result in either the degradation, interruption, or termination of communication link 18.

Consistent with the foregoing discussion, and like other ground-based terminals, terminal 16 could be present in rural, suburban, or urban areas. At any of these locations, terminal 16 could have a 180 degree field of view having varying degrees of localized signal obstructions such as trees, shrubs, utility poles, small and large buildings, bridges and the like above which the user sky is unobstructed and below which the user sky is partially or totally obstructed. At any location at which terminal 16 resides, the localized signal obstructions define a localized fade and blockage environment.

Regarding fading and blocking, each are greatly dependent upon the nature of the environmental obstructions. For instance, communication pathways normally experience shadowing when the line-of-sight between the satellite and the terminal is obstructed by trees and shrubs. In this regard, the degree of shadowing, or partial blockage, is greatly dependent upon the frequency of the carrier and the amount of foliage present upon the trees and bushes and other similar plant growth. Although shadowing does not necessarily block a communication pathway, its presence greatly diminishes the quality of the communication pathway and can lead to the eventual termination of the communication pathway. On the other hand, communication pathways normally experience complete blockage when the line-of-sight between the satellite and the terminal is obstructed by mountains and structures such as buildings or overpasses. In these cases, the line-of-sight becomes completely obstructed, often resulting in the termination of the communication pathway.

To accommodate local environmental obstructions and to increase the economy, efficiency, and reliability of communication system resources, the method and apparatus of the present invention operate to ascertain the blockage environment or the nature of local environmental obstructions present within the field of view of the terminal in order to establish where the user sky is clear, where it is shadowed by trees or shrubbery, and where it is blocked as a result of mountains and structures such as buildings or overpasses. In combination with the local blockage environment, the method and apparatus of the present invention also includes the determination of the instantaneous positions of one or more of the non-geosynchronous satellites in the constellation to predict fading and blocking and to facilitate one or more appropriate responses in the communication system to avoid fading and blocking as a result of the local environmental obstructions.

Figure 3:
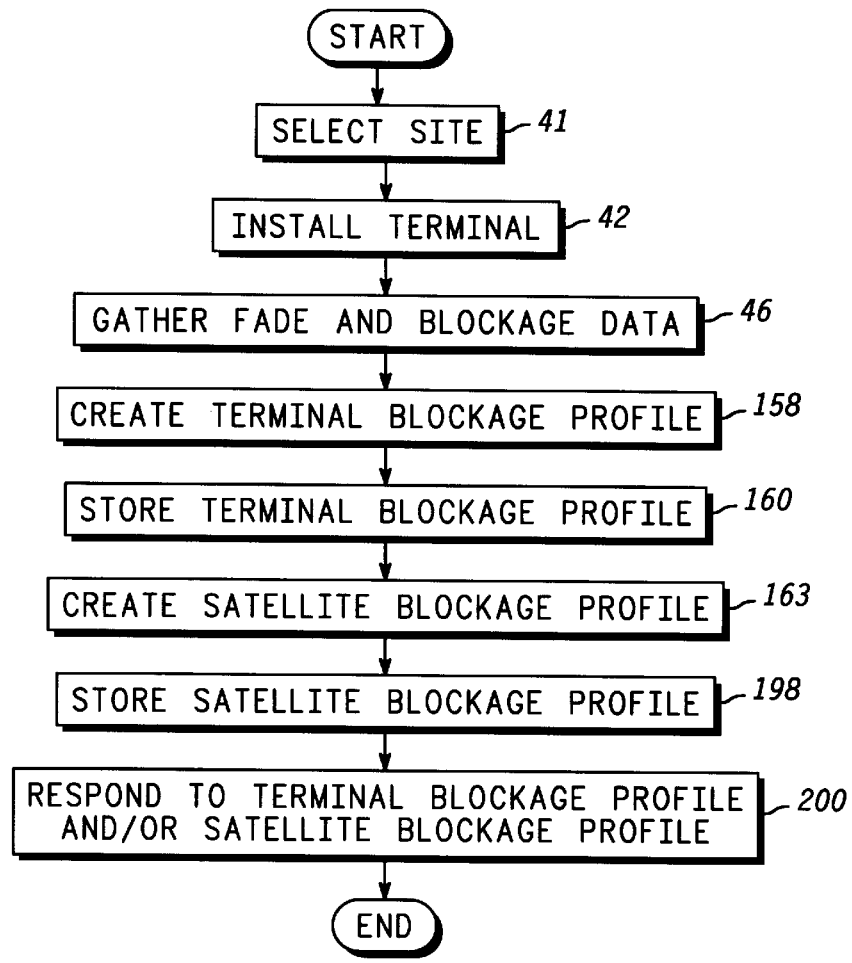
FIG. 3 is a flow chart of a method of establishing and responding to a blockage environment in a communication system in accordance with a preferred embodiment of the present invention.

With attention directed to FIG. 3, illustrated is a flow chart of a method of establishing and responding to a blockage environment in a communication system in accordance with a preferred embodiment of the present invention. The present method begins by selecting a site in task 41 at which terminal 16 will reside and then installing terminal 16 in task 42 at a either a rural, suburban, or urban area.

With momentary reference to FIG. 4, shown is a representation of a terminal antenna field of view 50 taken at the site of terminal 16 and illustrating potential signal environment obstructions 52. Field of view 50 illustrates obstructions 52 present at low signal angles which can lead to fading and blocking. Although obstructions 52 are herein shown as trees and shrubs and the like, obstructions 52 could also include mountains, buildings, or other obstructions. Obstructions 52 bound a clear and unobstructed user sky 53. Field of view 50 essentially defines the blockage profile of the terminal antenna at the site.

Referring back to FIG. 3, after the site has been selected and terminal 16 installed, a task 46 is performed to gather fade and blockage data present within the field of view 50 of the terminal antenna. For clarity, fade and blockage data is essentially comprised of the physical environment of the terminal antenna field of view 50 and of obstructions 52 shadowing or blocking user sky 53. In one embodiment, fade and blockage data could simply depicted as a binary condition, where, for a particular point in the terminal field of view, a zero could represent a clear condition and a one could represent a blocked condition, for example. In other embodiments, fade and blockage data could indicate a relative degree of blocking. For example, a scale of one to ten could be used to indicate how shadowed a signal is at a particular point. For example, a zero could indicate that no shadowing exists along the line of sight. A three could indicate that a mild obstruction (e.g., a tree) exists along the line of sight. A ten could indicate a complete blockage condition. This binary or relative degree depiction of a blockage environment could be applied to both a terminal blockage profile and a satellite blockage profile, both of which will be described in detail below.

As will be described in conjunction with FIGS. 5–10, task 46 could be performed in a variety of ways suitable for allowing a user to easily and efficiently establish a terminal blockage profile. Three exemplary ways of gathering fade and blockage data are: using the signature of the signals due to blocking (FIG. 5) (e.g., Fresnel diffracted signal measurements); using field of view (e.g., optical) data (FIG. 7); and using backscatter signal data (FIG. 9). Preferred embodiments of these three ways of gathering fade and blockage data will now be described, although other ways of gathering fade and blockage data also could be used.

Figure 5:
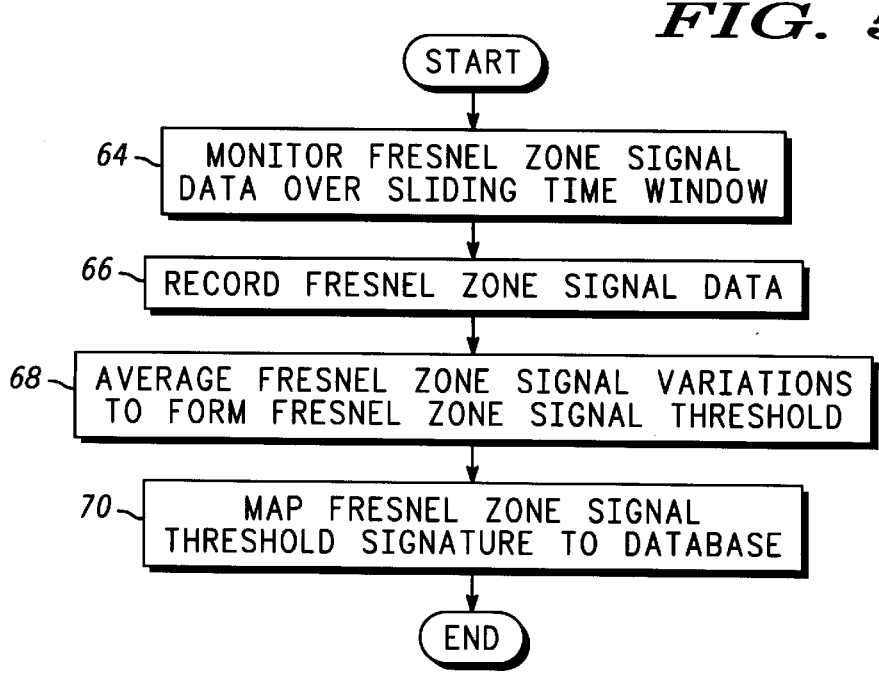
FIG. 5 is a flow chart of a method of creating a terminal blockage profile based on Fresnel diffracted signals in accordance with a preferred embodiment of the present invention.

Task 46 could be performed by creating a terminal blockage profile based on Fresnel diffracted signals. FIG. 5 is a flow chart of a method of creating a terminal blockage profile based on Fresnel diffracted signals in accordance with a preferred embodiment of the present invention. In alternate embodiments, other methods can be used which indicate blockages from signal measurements.

In a terminal-satellite communication system utilizing broadband channels, when the line of sight between the satellite and the terminal is unobstructed, the signal strength of the communication link is nearly constant. However, as the satellite moves in the user sky in relation to the terminal and the line-of-sight is about to be shadowed or blocked by an approaching obstruction, the Fresnel diffracted signal strength fluctuates as evidenced by rapid variations in the diffracted signal's amplitude. The variance in the amplitude of the Fresnel diffracted signal indicates that shadowing or blockage is about to occur as a result of an approaching obstruction.

Large objects such as mountains, buildings, and similar structures result in large variations in the Fresnel diffracted signal amplitude. In any event, the signature of the Fresnel diffracted signal will exhibit certain strength characteristics evidenced by variances in the Fresnel diffracted signal amplitude depending upon whether the line-of-sight between the satellite and the terminal is unobstructed, about to experience partial or total obstruction, shadowing, partial obstruction, and total obstruction.

Referring to FIG. 5 and pursuant to the foregoing, Fresnel diffracted signal data from one or more communication pathways or links is monitored over a sliding time window in task 64. The Fresnel diffracted signal data could be monitored either at terminal 16 or at one or more of the satellites 12 of the constellation of satellites. The Fresnel diffracted signal data is recorded in task 66 either at terminal 16 or at one or more of the satellites 12. The variations in the signal strength or amplitude of the Fresnel diffracted signal is then averaged or normalized in task 68 to create a Fresnel diffracted signal threshold or signature. In a preferred embodiment, the Fresnel threshold corresponds to an average signature of Fresnel diffracted signals for an average communication pathway within the field of view 50 of terminal 16. In alternate embodiments, the Fresnel threshold could be set at a different level. The Fresnel threshold is then mapped or plotted to a database in task 70 in the form of a map. Completion of tasks 64–70 result in the creation of a terminal blockage profile based on Fresnel diffracted signals.

FIG. 6 is an exemplary terminal blockage profile based on Fresnel diffracted signals which shows of a Fresnel threshold for a field of view of a terminal derived in accordance with a preferred embodiment of the present invention. Graph 72 corresponds to a two dimensional blockage profile 74 of a Fresnel signature 76 (e.g., of field of view 50 of terminal 16) plotted in the form of normalized signal intensity or strength 78 as a function of obstruction clearance 80. FIG. 6 illustrates the amplitude variations of a Fresnel diffracted signal where the obstruction is relatively straight. The edge of such an obstruction would be located where the obstruction clearance 80 equals zero at point 81. The variance in the amplitude of the Fresnel signature 76 corresponds to the blockage environment at the terminal antenna.

Figure 7:
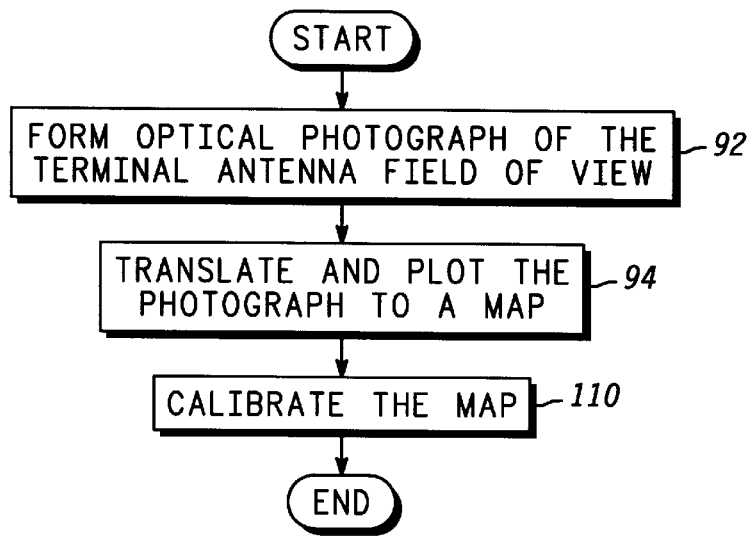
FIG. 7 is a flow chart of a method of creating an optical terminal blockage profile in accordance with a preferred embodiment of the present invention.

Referring back to FIG. 3, task 46 could also be performed by creating a terminal blockage profile of a field of view of the terminal antenna. In a preferred embodiment, a terminal blockage profile of a field of view of the terminal antenna is derived from optical data. However, in alternate embodiments, the field of view of the terminal antenna could be derived from data measurements anywhere along the spectrum (e.g., optical, infrared, ultraviolet). FIG. 7 is a flow chart of a method of creating an optical terminal blockage profile in accordance with a preferred embodiment of the present invention. In this regard, the optical terminal blockage profile corresponding to field of view 50 is initiated in task 92 by first forming an optical photograph or representation of field of view 50 of the terminal antenna with a camera and a fisheye lens having a full 180 degrees field of view.

The reduction of a fisheye optical photograph of a selected field of view is described in Akturan & Vogel, *Photogrammetric Mobile Satellite Service Prediction*, NAPEX 94 (Jun. 17, 1994). The optical photograph, of which would be generally representative to field of view 50 shown in FIG. 4, is then translated and mapped or plotted via an algorithm or other means in task 94 in the form of a map 96 as evidenced in FIG. 8.

Figure 8:
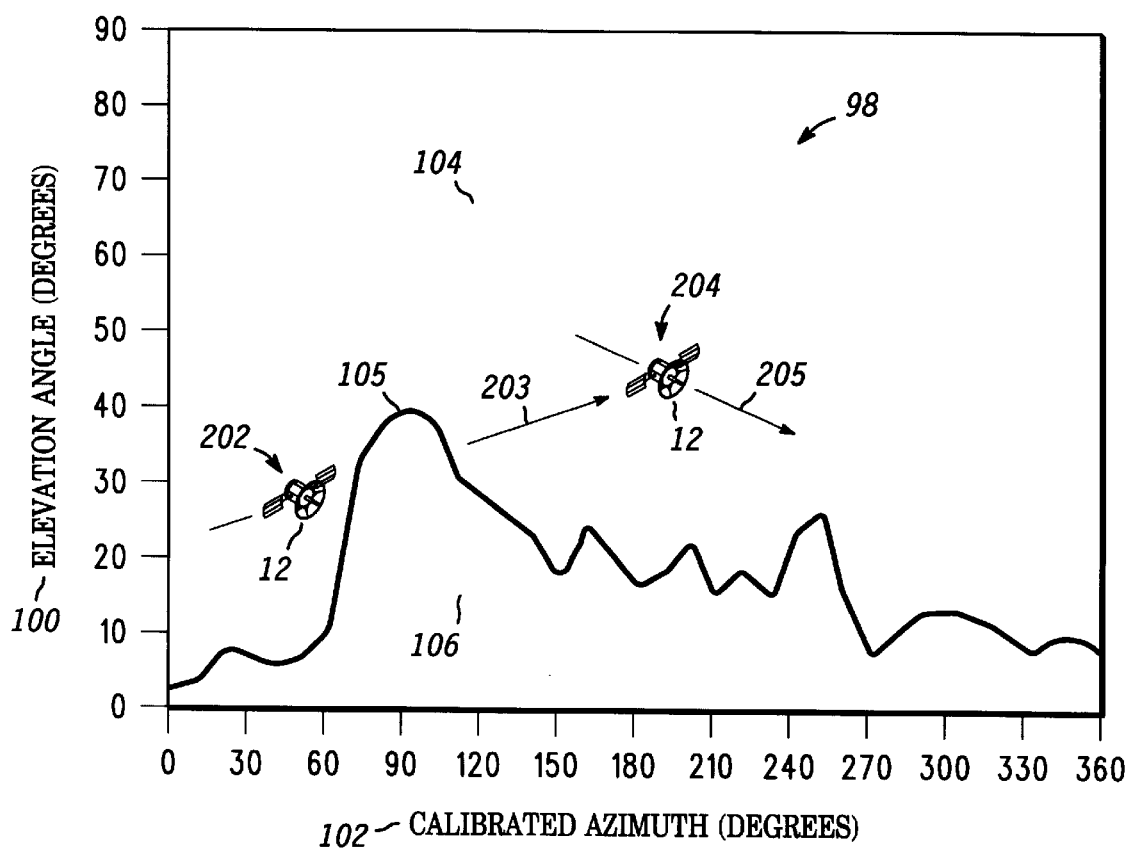
FIG. 8 is an optical terminal blockage profile of a field of view of a terminal derived in accordance with a preferred embodiment of the present invention.
Figure 9:
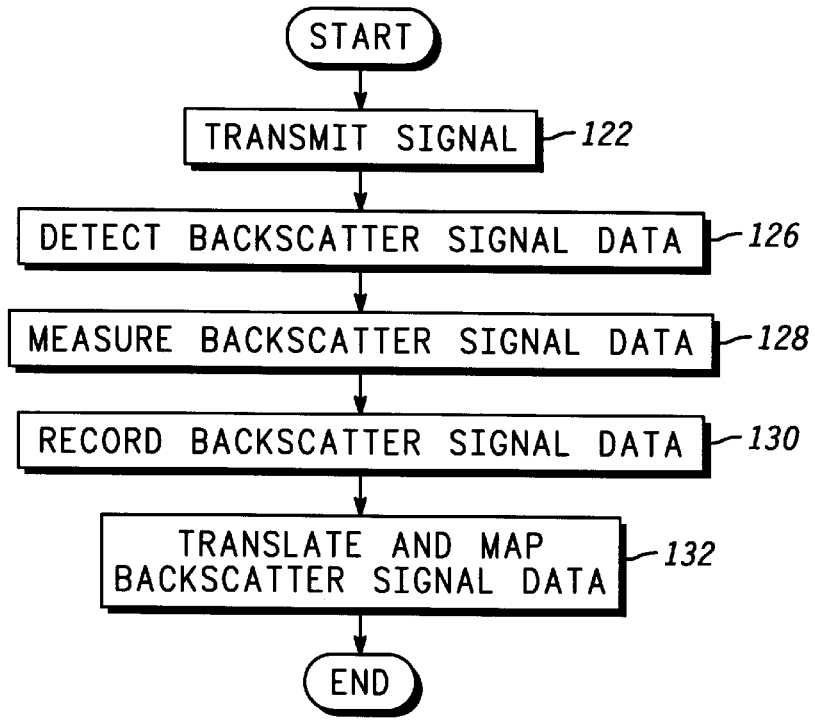
FIG. 9 is a flow chart of a method of creating a backscatter terminal blockage profile in accordance with a preferred embodiment of the present invention.

FIG. 8 is an exemplary optical terminal blockage profile of a field of view of a terminal derived in accordance with a preferred embodiment of the present invention. Map 96 corresponds to a two dimensional blockage profile 98 of an optical representation of field of view 50 of terminal 16 plotted in the form of elevation angle 100 as a function of azimuth angle 102 with area 104 above curve 105 corresponding to unobstructed user sky 53 in which communication may take place and area 106 below curve 105 corresponding to a blockage region defined by obstructions 52 present within field of view 50 in which communication may not take place.

Referring back to FIG. 7, once plotted, calibration of map 96 takes place in task 110. In a preferred embodiment, calibration of map 96 involves determining the direction of zero degrees in azimuth via a compass or other suitable mechanism to establish a coordinate system for terminal 16. Completion of tasks 92–110 result in the creation of an optical terminal blockage profile.

Referring back to FIG. 3, task 46 could further be performed by creating a backscatter terminal blockage profile by virtue of a backscatter technique. FIG. 9 is a flow chart of a method of creating a backscatter terminal blockage profile in accordance with a preferred embodiment of the present invention. In this regard, the backscatter terminal blockage profile (e.g., corresponding to field of view 50) is carried out in task 122 by first transmitting a signal from terminal 16. The signal could be produced from a transmitter housed at the site of terminal 16 and could be emitted via antenna 19 (FIG. 2) or a similar mechanism in the form of a radio frequency signal, an infrared signal, or perhaps an ultrasound signal.

Regarding a preferred embodiment, the emitted signal is preferably a high-frequency (e.g., Ka-band or above) signal that will reflect off of the environmental obstructions within field of view 50 of the terminal antenna. After transmission of the signal from terminal 16, the signal will impact obstructions 52 and reflect back to terminal 16 in the form of backscatter signal data. The backscatter signal data is then detected by terminal 16 in task 126 and measured in task 128 much like conventional radar measurements. The measurements are then recorded in task 130 either at terminal 16 or one or more of the satellites 12. In this manner, antenna 19 could be equipped with detection capabilities for detecting the backscatter signal data. The recorded backscatter signal data, which would be generally representative of field of view 50 shown in FIG. 4, is then translated and mapped or plotted via an algorithm or other means in task 132 in the form of a map 140 as evidenced in FIG. 10.

Figure 10:
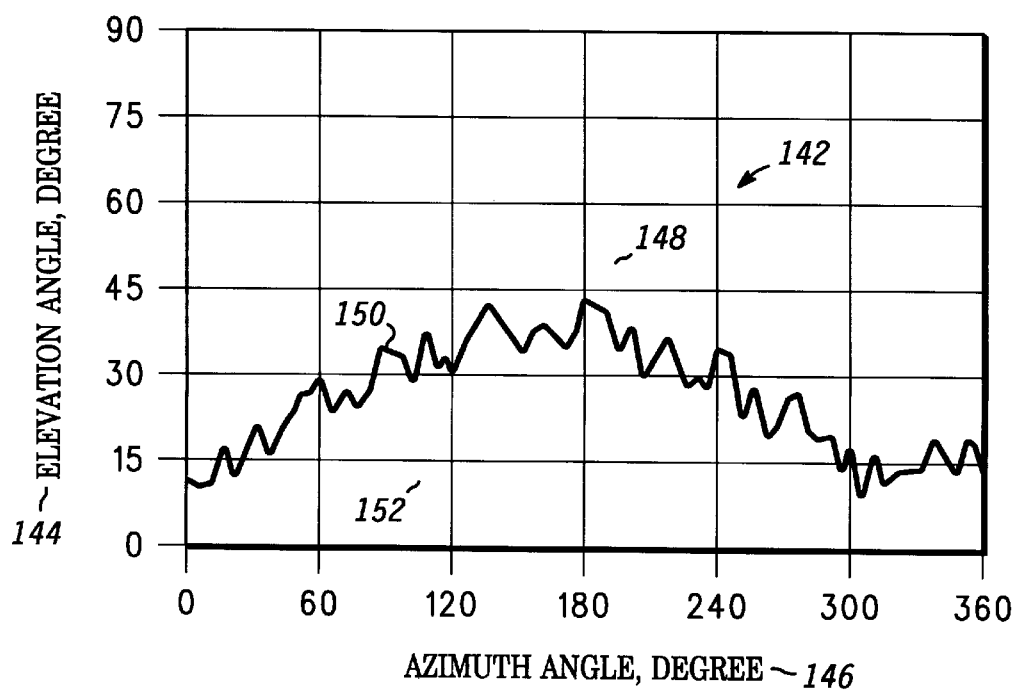
FIG. 10 is a backscatter terminal blockage profile of a field of view of a terminal derived in accordance with a preferred embodiment of the present invention.

FIG. 10 is an exemplary backscatter terminal blockage profile of a field of view of a terminal derived in accordance with a preferred embodiment of the present invention. Having similar characteristics to map 96 (FIG. 8) previously discussed, map 140 corresponds to a two dimensional blockage profile 142 of a backscatter representation of field of view 50 of terminal 16 plotted in the form of elevation angle 144 as a function of azimuth angle 146. Area 148 above curve 150 corresponds to unobstructed user sky 53 in which communication make take place and area 152 below curve 150 corresponds to a blockage region defined by obstructions 52 present within field of view 50.

Referring back to FIG. 3, after and/or concurrent with gathering fade and blockage data in task 46, a task 158 is performed which uses the fade and blockage data to create a terminal blockage profile (e.g., maps 72, 96, 140) of the field of view of the terminal antenna to establish where the user sky about terminal 16 is clear, shadowed, or blocked.

After the terminal blockage profile of the field of view 50 of the terminal antenna has been formed (e.g., by virtue of Fresnel diffracted signal measurements, field of view measurements, or backscatter measurements), the terminal blockage profile is then stored in task 160. The terminal blockage profile could be stored either at terminal 16, a separate control facility, or one or more of the satellites 12 of the constellation.

Figure 11:
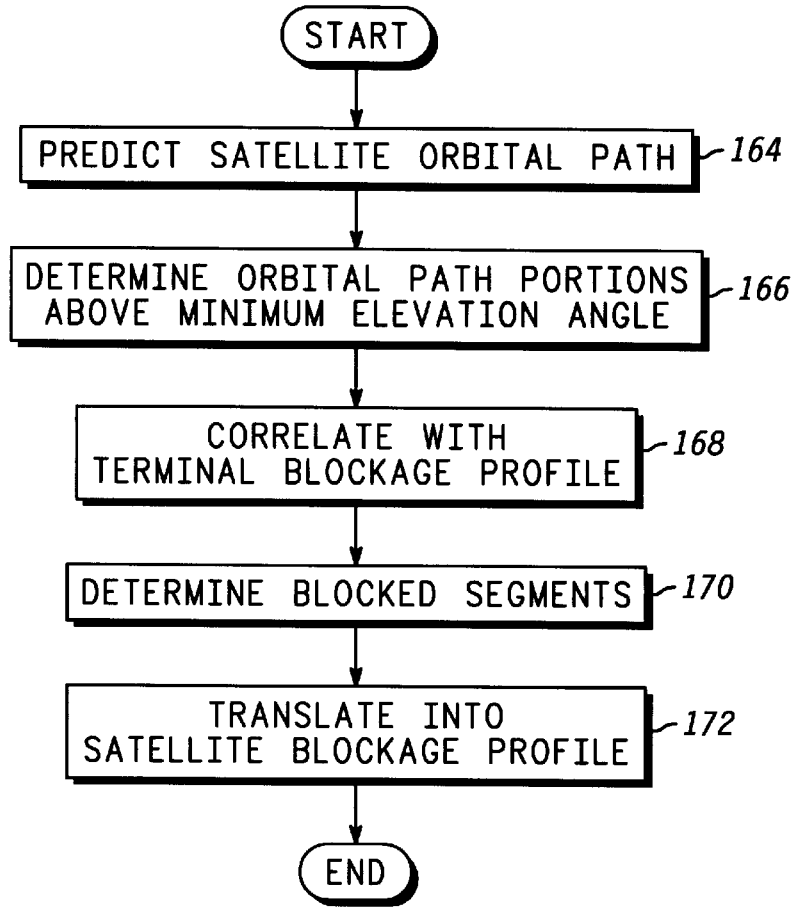
FIG. 11 is a flow chart of a method of creating a satellite blockage profile in accordance with a preferred embodiment of the present invention.

It may be periodically necessary to update the terminal blockage profile because the local environmental obstructions at the site at which terminal 16 resides could change. Additionally, the terminal blockage profile could require continuous or frequent updating if the terminal is continuously or intermittently mobile. Updating the terminal blockage profile would necessarily involve selectively and periodically or aperiodically repeating, in relevant part, the foregoing method steps relating to the creation of the terminal blockage profile. In furtherance of a preferred embodiment of the present invention, it is advantageous to determine satellite blockage profiles for use in making hand-off determinations and other system operation decisions. A satellite blockage profile maps blockage conditions between a terminal and a satellite from the satellite's perspective, whereas a terminal blockage profile maps the blockage environment from the terminal's perspective. Formation of a satellite blockage profile can be performed in several ways and takes place in task 163. FIG. 11 describes formation of a satellite blockage profile in accordance with a preferred embodiment and FIG. 12 describes formation of a satellite blockage profile in accordance with an alternate embodiment.

FIG. 11 is a flow chart of a method of creating a satellite blockage profile in accordance with a preferred embodiment of the present invention. The ground track of a non-geosynchronous satellite does not repeat from one orbit to the next. Thus, a satellite blockage profile covering only a first pass over a terminal is not likely to be valid for a next pass over the terminal. Satellite blockage profile data must be determined for each pass over the terminal.

The method begins, in step 164, by predicting a satellite orbital path by either a satellite, a control facility, or a terminal. A satellite orbital path can be predicted, for example, by propagating the satellite path forward into the future from a known satellite location in accordance with the satellite's orbital parameters. In other embodiments, prediction of the satellite orbital path can be made by other methods known to those of skill in the art.

The method described in conjunction with FIG. 11 uses terminal blockage profile data derived in accordance with steps 46–160 of FIG. 3. For the preferred embodiment of the present invention, the terminal blockage profile is available to the satellite blockage profile creation process. In step 166, at least those portions of the satellite orbital path for which the satellite will be located within the field of view of the terminal antenna. In step 168, those portions of the orbital path are analyzed in the context of the terminal blockage profile.

Based on this analysis, segments of those portions during which a satellite-to-terminal communication link would be blocked, shadowed, or clear are determined in step 170. Desirably, this results in a set of times and/or satellite locations during which high-quality communications is possible between the satellite and terminal. In step 172, information describing the blocked, shadowed, and clear conditions are translated into a satellite blockage profile for that pass. Thus, performance of steps 164–172 result in the creation of a satellite blockage profile. The satellite blockage profile can be translated to the terminal perspective as well, by translating the satellite locations into pointing angles for the terminal's directional antennas, for example, using mathematical techniques well known to those of skill in the art.

Figure 12:
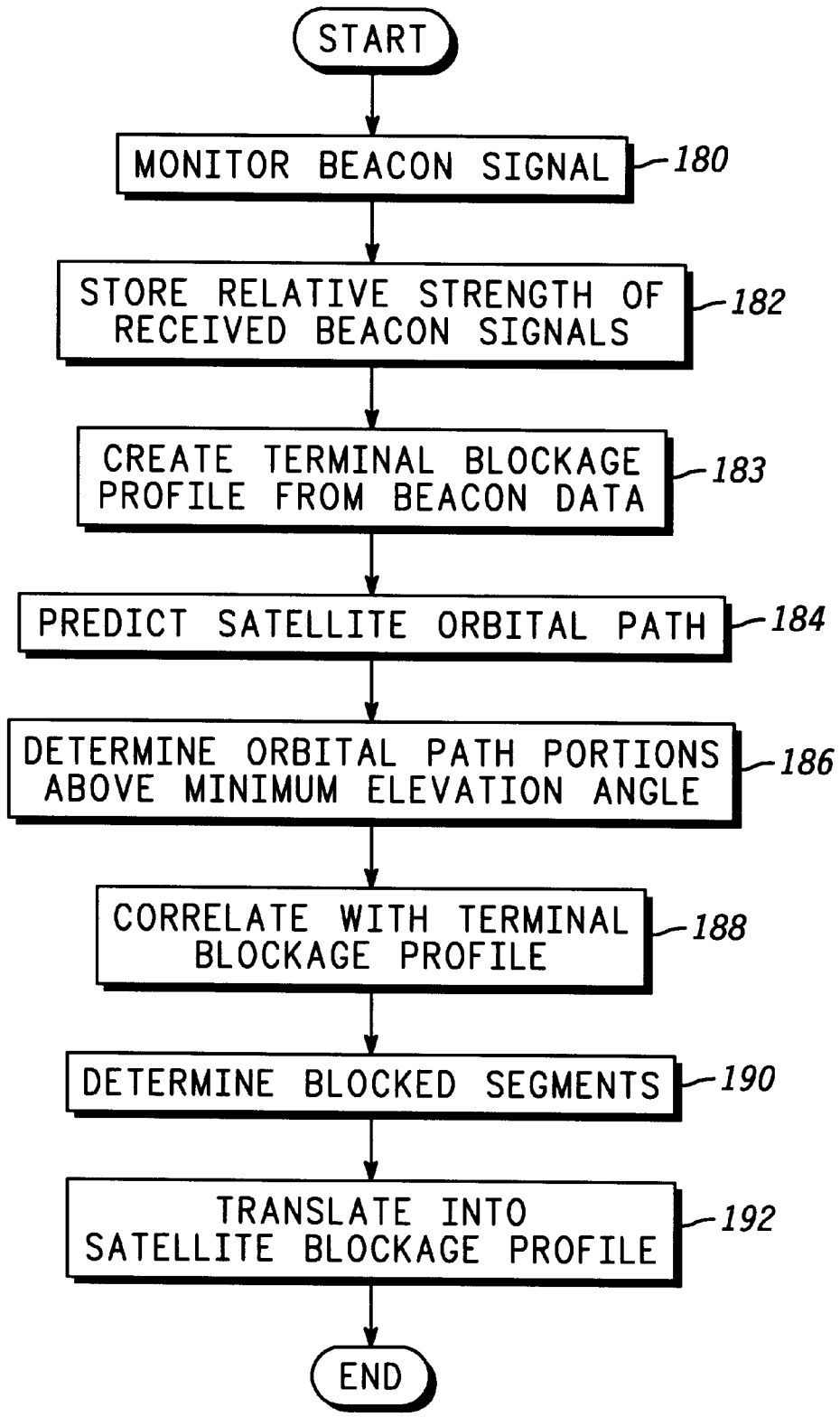
FIG. 12 is a flow chart of a method of creating a satellite blockage profile in accordance with an alternate embodiment of the present invention.

Referring back to FIG. 3, creation of a satellite blockage profile in task 163 can alternatively be performed using a method as described in FIG. 12. FIG. 12 is a flow chart of a method of creating a satellite blockage profile in accordance with an alternate embodiment of the present invention. The method described in conjunction with FIG. 12 does not need to use terminal blockage profile data derived in accordance with steps 46–160 of FIG. 3. In accordance with the alternate embodiment, terminal 16, is equipped with a beacon (e.g., an infrared transmitter) that emits a beacon signal which can be received by a satellite 12. During the course of a satellite pass (e.g., when satellite 12 is above a minimum elevation angle with respect to terminal 16), satellite 12 monitors this beacon signal in step 180 to determine the beacon's relative received strength. Where the received beacon signal is weak or non-existent, a partial or total obstruction between the satellite and terminal is likely. In another alternate embodiment, satellite 12 could be equipped with a beacon (rather than or in addition to terminal 16) and the beacon signals emitted by the satellite could be measured at the ground to determine obstructions.

The relative strengths of the received beacon signal measurements for a particular terminal are stored in task 182 to a database located either at terminal 16, a control facility, or one or more of the satellites 12 of the constellation. Data from numerous passes over a terminal can be combined to form a terminal blockage profile in step 183. This profile can be later processed to compute a map from a satellite's perspective that depicts the trajectory of the terminal as well as the time evolution of its blocking environment.

When blockage information is desired for an upcoming satellite pass with respect to a particular terminal, the satellite orbital path is predicted, in step 184, by either a satellite, a control facility, or a terminal. In step 186, at least those portions of the satellite orbital path for which the satellite will be located within the field of view of the terminal antenna. In step 188, those portions of the orbital path are analyzed in the context of with the data from the terminal blockage profile derived from beacon signal measurements.

Based on this analysis, segments of those portions during which a satellite-to-terminal communication link would be blocked, shadowed, or clear are determined in step 190. Desirably, this results in a set of times and/or satellite locations during which high-quality communications is possible between the satellite and terminal. In step 192, information describing the blocked, shadowed, and clear conditions are translated into a satellite blockage profile for that pass. Thus, performance of steps 180–192 result in the creation of a satellite blockage profile.

In a preferred embodiment, steps 180–182 are repeated each time a system satellite achieves a minimum angle of elevation with respect to the terminal, although selectively fewer repetitions could be performed. Repeated performance of steps 180–182 results in the creation of a cumulative database of blockage information. Steps 184–192 are performed each time a blockage profile for a particular satellite pass is desired.

As stated previously, to create a satellite blockage profile in accordance with FIG. 12, terminal blockage profile data derived from measurements made by the terminal is not necessary. Therefore, steps 46–160 of FIG. 3 need not necessarily be performed in order to achieve the advantages of the present invention.

Referring back to FIG. 3, the satellite blockage profile is stored in step 198. Desirably, the satellite blockage profile is stored in one or more satellites 12, although the profile could be stored in a terminal or control facility.

By virtue of an algorithm or other mechanism present at terminal 16, one or more of the satellites 12 of the constellation, or at a control facility, a response to the terminal blockage profile and/or the satellite blockage profile could be made in task 200 prior to fading or blocking of one or more communication pathways or links. The response could be made and controlled by an algorithm housed at terminal 16, a control facility or perhaps one or more of the satellites 12 of the constellation. In one embodiment, the response could be initiated exclusively by terminal 16 and/or satellite 12. In another embodiment, terminal 16 and/or satellite 12 could send information describing a blockage profile to a control facility. The control facility could then use that information to control communications between terminal 16 and satellite 12. The control facility could, for example, send instructions based on the information to either or both terminal 16 and satellites 12. These instructions, for example, could cause a hand-off to occur.

In a preferred embodiment, such a response is based on both a terminal blockage profile and a satellite blockage profile. However, in various alternate embodiments, the response could be based on either blockage profiles separately. Where the response is based on either a terminal blockage profile or the satellite blockage profile separately, the steps necessary to create the other type of blockage profile would not be necessary.

In a specific example of a preferred embodiment, a terminal blockage profile is used to determine when a hand-off from one satellite to another should occur. FIG. 8 illustrates a first satellite 12 at position 202 traveling in a direction indicated by the arrowed line 203, and second satellite 12 at position 204 traveling in a direction indicated by the arrowed line 205, both of which are shown as they would appear mapped onto map 96. Satellite 12 at position 202 is traveling in area 104 and is about to enter blockage region 106, whereas satellite 12 at position 204 is traveling in area 104 corresponding to unobstructed user sky 53 and is not about to enter blockage region 106.

A communication link or pathway between satellite 12 at position 202 and terminal 16 would become blocked, either partially or totally, as satellite 12 at position 202 enters blockage region 106. However, in this situation, the present invention can predict that event and respond in task 200 (FIG. 3) to the blockage environment and the satellite blockage profile to inhibit the communication link from becoming blocked. An appropriate response in the present situation and provided by virtue of the present invention would be to hand-off, in task 200, from satellite 12 at position 202 to satellite 12 at position 204 prior to satellite 12 at position 202 entering blockage region 106.

To properly respond to the terminal blockage profile and/or the satellite blockage profile in accordance with task 200, it may be necessary to monitor one or more of the communication links between one or more satellites 12 and terminal 16. For instance, consistent with the terminal blockage profile based on Fresnel diffracted signals (FIG. 6), as satellite 12 at position 202 approaches blockage region 106, rapid variations in the Fresnel diffracted signal for the communication pathway will occur. When the variations in the Fresnel diffracted signal of the communication link fall outside the Fresnel threshold 76 established in map 70 to indicate the approaching blockage region 106 (FIG. 8), hand-off to an unobstructed satellite such as satellite 12 at position 204 would be appropriate. In this regard, task 200 could further include monitoring one or more communication links between one or more of the satellites 12 of the constellation and initiating hand-off when the Fresnel diffracted signal variations of the one or more communication links fall outside the Fresnel threshold in accordance with FIG. 6. After responding to the blockage profiles in step 200, the method ends.

Although not herein specifically discussed, it will be understood that a system response could be made using a terminal blockage profile created by any of the methods shown in FIGS. 5, 7, and 9 (or other methods), by using a satellite blockage profile created by either of the methods shown in FIGS. 11 and 12 (or other methods), or by using both terminal and satellite blockage profiles. In addition, the system response is not limited to determining when hand-off should occur. Other system functions could use the information contained within either or both the terminal and satellite blockage profiles. For example, the system might want to know when multiple satellites have clear communication paths with a particular terminal for the purpose of triangulating to determine the precise terminal location.

As another example, information contained within multiple blockage profiles could be used by the system to control communications. For example, blockage profile information from one or more reporting terminals and/or satellites could be received by a control facility. The control facility could then use the information to generate a map of obstructions for a particular geographic area. This obstruction map, for example, could indicate the presence of semi-permanent obstruction, such as buildings, mountains, and overpasses, which would affect communications with any terminal in proximity to the obstruction.

The dimensions of the map would be determined by the number of terminals and/or satellites which report blockage information to the control facility. Once the control facility has generated the map of obstructions, the control facility could use the map to control communications with the reporting terminals, and also with other, non-reporting terminals within the geographic area. Many other applications could be imagined and are intended to be incorporated within the scope of the present invention.

Figure 13:
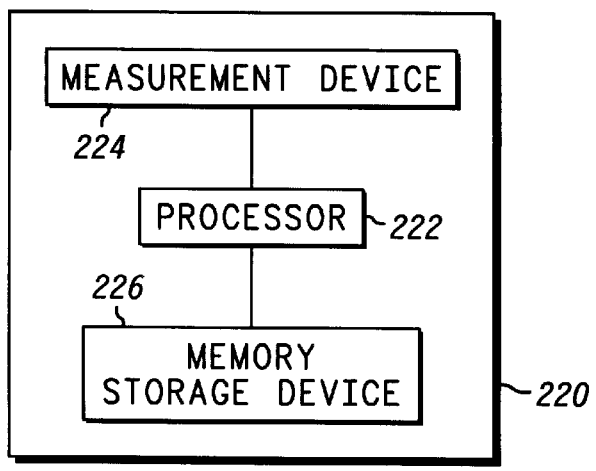
FIG. 13 is a simplified block diagram of a terminal in accordance with a preferred embodiment of the present invention.

FIG. 13 is a simplified block diagram of a terminal in accordance with a preferred embodiment of the present invention. Terminal 220 includes processor 222 and memory storage device 226. Memory storage device 226 is capable of storing a terminal blockage profile. As described in conjunction with various embodiments of the invention, the terminal blockage profile could include, for example, a map of the environment experienced by the terminal antenna which could be a map derived from signal measurements (e.g., Fresnel diffracted signal measurements), a field of view map, or a backscatter data map. In alternate embodiments, a terminal blockage profile could be stored at a control facility, a satellite, or a combination thereof.

Processor 222 is used to respond to the terminal blockage profile, when necessary. Such response could be initiated by processor 222, for example, or could result from the receipt of an instruction directing processor 222 to respond to the terminal blockage profile. Responding to the terminal blockage profile, for example, could involve processor 222 executing an algorithm for initiating one or more hand-offs to one or more satellites. In a preferred embodiment, processor 222 is also for periodically initiating update of the terminal blockage profile.

In a preferred embodiment, terminal 220 also includes measurement device 224. Measurement device 224 is not necessary in those embodiments where terminal 220 does not gather data for its blockage profile. However, in those embodiments where terminal 220 does gather data for the terminal blockage profile, measurement device 224 could be, for example, a device for detecting Fresnel diffracted signals, an optical fisheye lens, or a backscatter signal detection device.

In summary, the present invention provides a system and method which inhibits fading and blocking of communication pathways or links in a non-geosynchronous communication system. The present invention operates to establish a terminal blockage profile and/or a satellite blockage profile with respect to a terminal antenna. Having knowledge of the blockage environment experienced by the terminal antenna and knowledge of the instantaneous positions of one or more satellites in a constellation of non-geosynchronous satellites, the present invention includes the provision of responding to this information, for example, by handing off from a satellite which is or will experience blockage to another satellite free from imminent obstructions.

The present invention has been described above with reference to a preferred embodiment. However, those skilled in the art will recognize that changes and modifications could be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

What is claimed is:

1. A method of responding to a blockage environment in proximity to a terminal antenna, which terminal is capable of communicating with nodes of a communication system, the method comprising the steps of:

creating a terminal blockage profile at the terminal antenna;

gathering, by the terminal, blockage data at the terminal antenna including gathering Fresnel zone signal data from one or more line-of-sight communication link signals;

mapping the blockage data to a blockage profile database;

monitoring the Fresnel zone signal data from the one or more line-of-sight communication link signals over a sliding time window;

recording the Fresnel zone signal data; and controlling communications between the terminal and at least one node based on the terminal blockage profile.

2. The method of claim 1, wherein the step of mapping the blockage data to a blockage profile database further includes the steps of:

averaging Fresnel zone signal data variations of the Fresnel zone signal data to form a Fresnel zone signal threshold; and plotting the Fresnel zone signal threshold in the form of minimum elevation angle as a function of azimuth angle.

3. The method of claim 1, wherein the step of gathering blockage data further includes the step of measuring data describing a field of view of the terminal antenna wherein the measurements can be taken anywhere along a spectrum.

4. The method of claim 1, wherein the step of gathering blockage data further includes the step of forming a backscatter representation of a field of view of the terminal antenna.

5. The method of claim 4, wherein the step of forming a backscatter representation of a field of view of the terminal antenna further includes the steps of:

transmitting signal data;

detecting backscatter signal data resulting from the transmitted signal data; and recording the backscatter signal data.

6. The method of claim 5, wherein the step of mapping the blockage data to a blockage profile database further includes the step of plotting the backscatter signal data in the form of minimum elevation angle as a function of azimuth angle.

7. The method of claim 1, wherein the step of creating a terminal blockage profile further includes the step of storing the terminal blockage profile.

8. The method of claim 1, further including the step of periodically updating the terminal blockage profile.

9. The method of claim 1, wherein the step of responding to the terminal blockage profile further includes the step of initiating one or more hand-offs of the terminal to one or more satellites.

10. The method of claim 9, further including the step of creating a satellite blockage profile of one or more satellites.

11. The method of claim 10, wherein the step of creating a satellite blockage profile of one or more satellites includes the steps of:
predicting the future orbit paths of one or more satellites; and
correllating the future orbit paths of one or more satellites with the terminal blockage profile.

12. The method of claim 10, wherein the step of creating a satellite blockage profile of one or more satellites includes the steps of:
monitoring a beacon signal transmitted by the terminal; and
storing beacon signal measurements describing a relative strength of the beacon signal into a database.

13. The method of claim 10, wherein the step of creating a satellite blockage profile of one or more satellites includes the step of storing the satellite blockage profile.

14. The method of claim 1, wherein the step of controlling communications comprises the step of:
initiating one or more hand-offs between the terminal and one or more of a plurality of satellites based on the terminal blockage profile.

15. The method of claim 14, further comprising the step of:
receiving a message from a control facility to initiate the one or more hand-offs.

16. The method of claim 1, further comprising the step of:
sending information contained within the terminal blockage profile to a control facility.

17. A method of responding to a blockage environment in proximity to a terminal antenna, which terminal is capable of communicating with nodes of a communication system, the method comprising the steps of:
creating a terminal blockage profile at the terminal antenna using a measurement device which is capable of measuring data which describes the blockage environment;
storing the terminal blockage profile in a storage device;
sending data describing the terminal blockage profile to a control facility, where the control facility receives information describing one or more blockage profiles from one or more terminal antennas;
the control facility using the information to generate an obstruction map for a geographic area; and
the control facility controlling communications between terminals within the geographic area and at least one node based on the obstruction map; and
the terminal responding to the terminal blockage profile by controlling communications between the terminal and at least one node based on the terminal blockage profile, wherein the controlling step is performed by a processor of the terminal.

18. A system for responding to a blockage environment in a communication system, the system comprising:
a Fresnel zone measurement device capable of measuring data which describes the blockage environment;
a storage device coupled to the Fresnel zone measurement device, the storage device being capable of storing a terminal blockage profile of an environment of a terminal antenna; and
a processor capable of responding to the terminal blockage profile, coupled to the storage device.

19. The system as claimed in claim 18, wherein the measurement device comprises:
a field of view measurement device.

20. The system as claimed in claim 18, wherein the measurement device comprises:
a backscatter data measurement device.

21. A system for responding to a blockage environment in a communication system, the system comprising:
a means for storing a terminal blockage profile of an environment of a terminal antenna the means for storing the terminal blockage profile including a map of the environment of the terminal antenna;
means for collecting Fresnel zone measurements coupled to the means for storing, wherein the map of the environment of the terminal antenna includes a Fresnel zone map of a Fresnel zone signal threshold of the environment of the terminal antenna; and
means for responding to the terminal blockage profile, coupled to the means for storing.

22. The system of claim 21, wherein the Fresnel zone signal threshold includes an average of the Fresnel zone signal data variations acquired from one or more line-of-sight communication signals over a sliding time window.

23. The system of claim 22, wherein the Fresnel zone map includes a plot of the Fresnel zone signal threshold in the form of minimum elevation angle as a function of azimuth angle.

24. The system of claim 21, further comprising a means for collecting field of view data, wherein the map of the environment of the terminal antenna includes a map of the field of view data derived from measurements taken anywhere along a spectrum.

25. The system of claim 21, further comprising a means for collecting backscatter data measurements, wherein the map of the environment of the terminal antenna further includes a backscatter data map of a backscatter environment of the terminal antenna.

26. The system of claim 25, wherein the backscatter data map includes a plot of backscatter signal data of the environment of the terminal antenna in the form of minimum elevation angle as a function of azimuth angle.

27. The system of claim 21, wherein the means for storing the terminal blockage profile includes a terminal.

28. The system of claim 21, wherein the means for storing the terminal blockage profile includes a control facility.

29. The system of claim 21, wherein the means for storing the terminal blockage profile includes a satellite.

30. The system of claim 21, further including means for periodically updating the terminal blockage profile, coupled to the means for storing the terminal blockage profile.

31. The system of claim 21, wherein the means for responding to the terminal blockage profile includes means for executing an algorithm for initiating one or more hand-offs to one or more of a plurality of satellites.

* * * * *